(12) United States Patent
Sadanowicz et al.

(10) Patent No.: US 7,610,999 B2
(45) Date of Patent: Nov. 3, 2009

(54) WHEEL HUB

(75) Inventors: David Thomas Sadanowicz, Canton, MI (US); Larry William Brackmann, Brighton, MI (US); Eric James Barber, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 885 days.

(21) Appl. No.: 11/162,133

(22) Filed: Aug. 30, 2005

(65) Prior Publication Data
US 2007/0045066 A1 Mar. 1, 2007

(51) Int. Cl.
*F16D 65/12* (2006.01)
(52) U.S. Cl. .............. 188/218 XL; 188/18 A
(58) Field of Classification Search ........ 188/18 A, 188/218 XL, 264 AA; 301/6.1, 6.8
See application file for complete search history.

(56) References Cited

U.S. PATENT DOCUMENTS

| | | | |
|---|---|---|---|
| 5,921,633 A * | 7/1999 | Neibling et al. ............ 301/6.1 |
| 6,059,374 A * | 5/2000 | Goddard .................... 301/6.1 |
| 6,095,291 A * | 8/2000 | Bertetti et al. ............ 188/18 A |
| 6,139,215 A * | 10/2000 | Kuhne et al. .............. 403/337 |
| 6,145,632 A | 11/2000 | Rutter | |
| 6,212,981 B1 | 4/2001 | Bringker et al. | |
| 6,604,794 B1 | 8/2003 | Messina | |
| 6,796,029 B2 | 9/2004 | Mazur | |
| 6,808,050 B2 * | 10/2004 | Lehmann et al. ...... 188/218 XL |
| 6,821,022 B2 | 11/2004 | Burnetti | |
| 7,380,644 B2 * | 6/2008 | Ward et al. ................. 188/71.8 |

* cited by examiner

*Primary Examiner*—Bradley T King
(74) *Attorney, Agent, or Firm*—Maginot, Moore & Beck

(57) ABSTRACT

A wheel hub for a corner assembly on a vehicle wherein a wheel and a rotor for a brake system are attached to the wheel hub. The wheel hub has a cylindrical body with a peripheral surface thereon having a flange to which the rotor and the rim of a wheel are attached and a bearing surface that receives a bearing fixed to a stationary member to establish a perpendicular alignment between first and second engagement faces on the rotor and friction members carried by a caliper. A attachment clip attached to the flange resiliently urges the rotor toward the flange to sustain the perpendicular alignment even though the rotor may axially translate during a brake application.

17 Claims, 4 Drawing Sheets

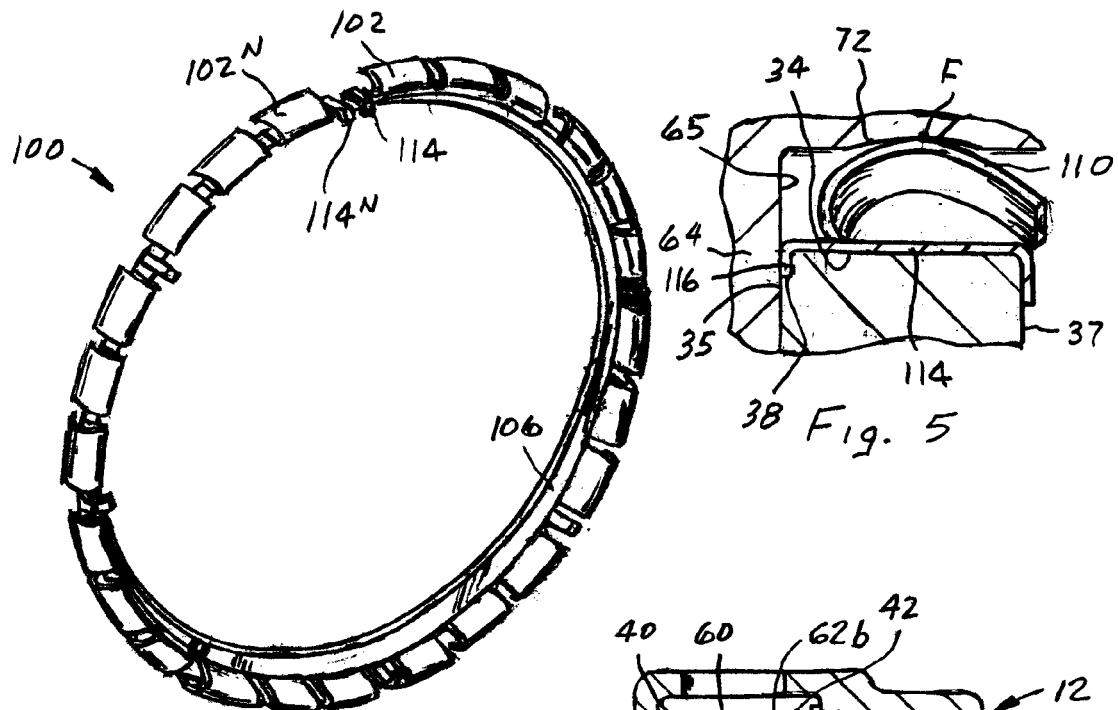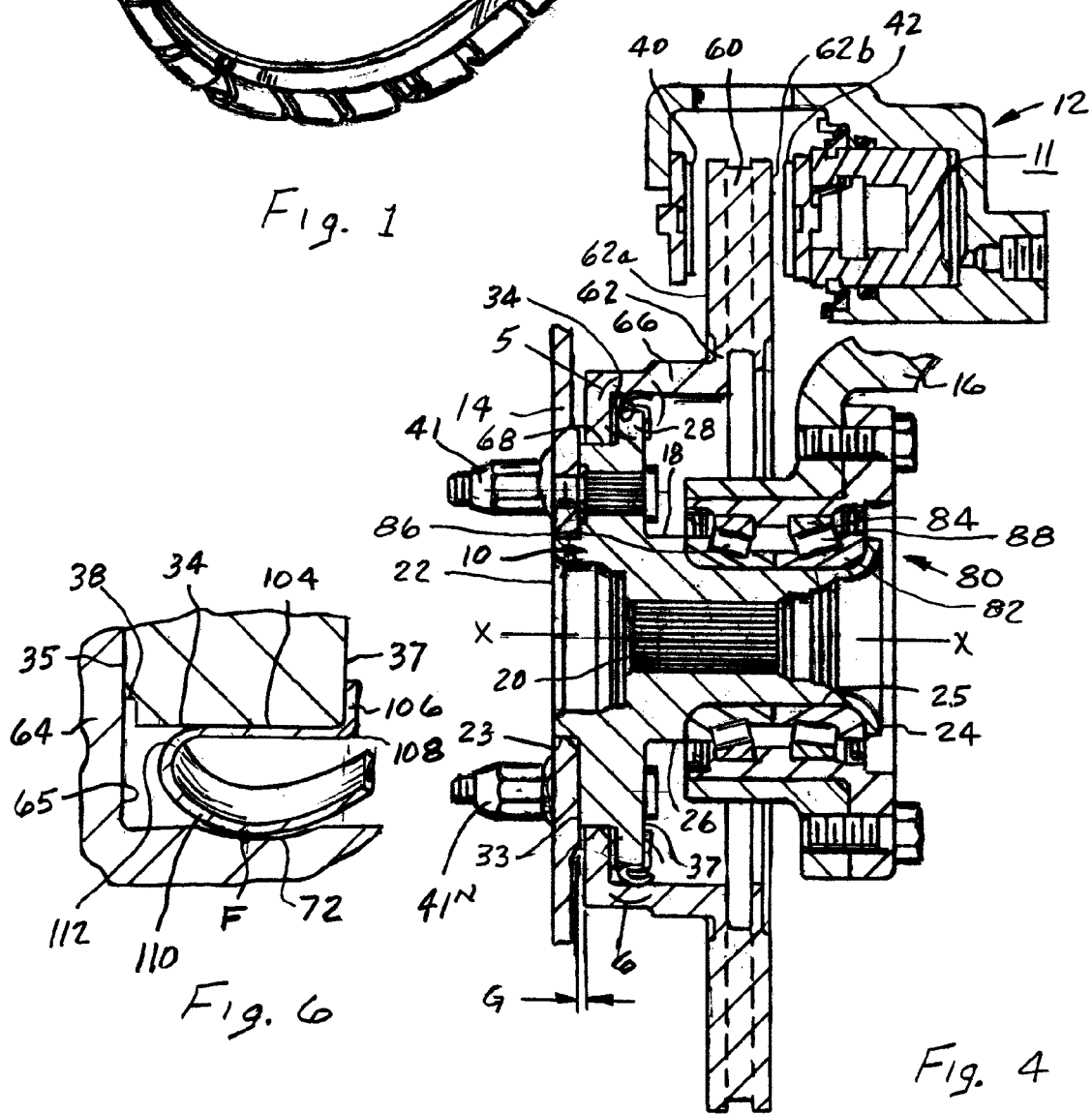

WHEEL HUB

BACKGROUND OF THE INVENTION

This invention relates to a wheel hub in a corner assembly of a vehicle and a clip through which a rotor is connected to the wheel hub such that the rotor may axially translate during a brake application.

Disc brake systems are commonly used on most vehicles because of their effectiveness in stopping a vehicle. In such systems, a bearing assembly is fixed to a wheel hub that is bolted to a knuckle member or fixed member, a brake rotor is attached to the wheel hub, a caliper that is bolted to the knuckle member spans the rotor and a rim for a wheel is attached to the wheel hub. The knuckle member is pivotally attached to the frame of the vehicle while a fixed member is part of the frame and a caliper is bolted to the knuckle member or fixed member to locate first and second friction members carried by the caliper on opposite sides of the rotor to define a corner assembly. In such a system the rim is attached to the wheel hub through a plurality of bolts that extend from a flange on the wheel hub to clamp the rotor between the flange and the rim. The rotor is clamped through a prescribed torque being applied to nuts that axial compresses the central portion of the wheel rim on to the brake flange on the hub. Should a different torque be applied a nut it is possible to introduce a stress into the rotor that may effect a perpendicular relationship that is desirable between the faces on the rotor and corresponding friction pads retained by the caliper. Processes for manufacturing a corner assembly wherein surfaces on a wheel hub and knuckle are machined in a fixture to maintain a perpendicular relationship between the wheel hub and knuckle are disclosed in U.S. Pat. Nos. 6,212,981 and 6,796,029. In addition, it is disclosed in U.S. Pat. No. 6,145,632 to attach a rotor to a hub through a splined connection and in U.S. Pat. No. 6,604,794 to weld the rotor onto the flange of a hub. While the machining is designed to establish an initial perpendicular relationship between the axis of the wheel hub and first and second faces on the rotor considerable time, effort and processing must be expended to achieve this desired result whereas in the splined connection a force hold the rotor tight against the hub to maintain the splined connection.

SUMMARY OF THE INVENTION

It is an object of the present invention to provide a hub for a wheel of a corner module assembly used in a vehicle wherein a rotor and rim of a wheel are retained on the hub in a manner that allows the rotor to axially translate during a brake application while being perpendicularly aligned between first and second friction member in an absence of a brake application.

In more particular detail the wheel hub is attached to a stationary member through a bearing and a wheel and rotor attached to the wheel hub wherein the rotor is perpendicularly aligned with a caliper that is attached to the stationary member. The wheel hub has a peripheral surface with a flange thereon for receiving the wheel and the rotor and a bearing surface on which the bearing is located to establish the perpendicular space relationship for first and second faces on the rotor with first and second friction members retained by the caliper. The flange is characterized by a first annular surface that receives the rim of the wheel and is separated from a scalloped torque receiving surface by a first radial surface and the torque receiving surface is separated from an annular peripheral surface by a second radial surface. The rotor is characterized by a first radial member that is offset from a second radial member on which the first and second faces are located by a cylindrical member. The first radial member having an inner peripheral surface with a plurality of arcuate projections thereon that are complementary to the scalloped torque receiving surface on the flange. The cylindrical member has an inner arcuate groove that is located between the first radial member and the second radial member. The arcuate projections are mated with the scalloped surface such that the first radial member engages the second radial surface on the flange to establish the perpendicular space relationship. This perpendicular relationship is maintained by clip means that are attached to the annular peripheral surface on the flange and engages the arcuate groove on the cylindrical member with a point contact to provide a resultant force that produces an axial force that urges the first radial member toward the first radial surface to define a gap between the first radial member and rim of the wheel and an radial force to dampens any radial movement of the rotor.

It is an object of this invention to provide a wheel hub for a corner assembly having a cylindrical body wherein a rim for a wheel is fixed to a flange thereon while a rotor is resiliently attached to the flange such that the rotor may axially translate during a brake application while being urged into a fixed position on the hub in the absence of a brake application.

An advantage of the present invention resides in the resilient attachment of a rotor to a hub wherein an axial force urges the rotor toward an alignment surface such that first and second engagement surfaces on the rotor are substantially perpendicular to corresponding first and second friction pads carried by a caliper and a radial force dampens any radial movement of the rotor to attenuate the creation of noise.

BRIEF DESCRIPTION OF THE DRAWINGS

FIG. 1 is a perspective view of an attachment clip for attaching a rotor to a wheel according to the present invention;

FIG. 4 is a sectional view of a corner assembly wherein a rotor is attached to the wheel hub through the use of the attachment clip of FIG. 1;

FIG. 5 is an enlarged view of the circumscribed area 5 of FIG. 4 showing a locking tab on the attachment clip;

FIG. 6 is an enlarged view of the circumscribed area 6 of FIG. 4 showing a resilient projection on the attachment clip;

DETAILED DESCRIPTION OF THE INVENTION

Figure 2:
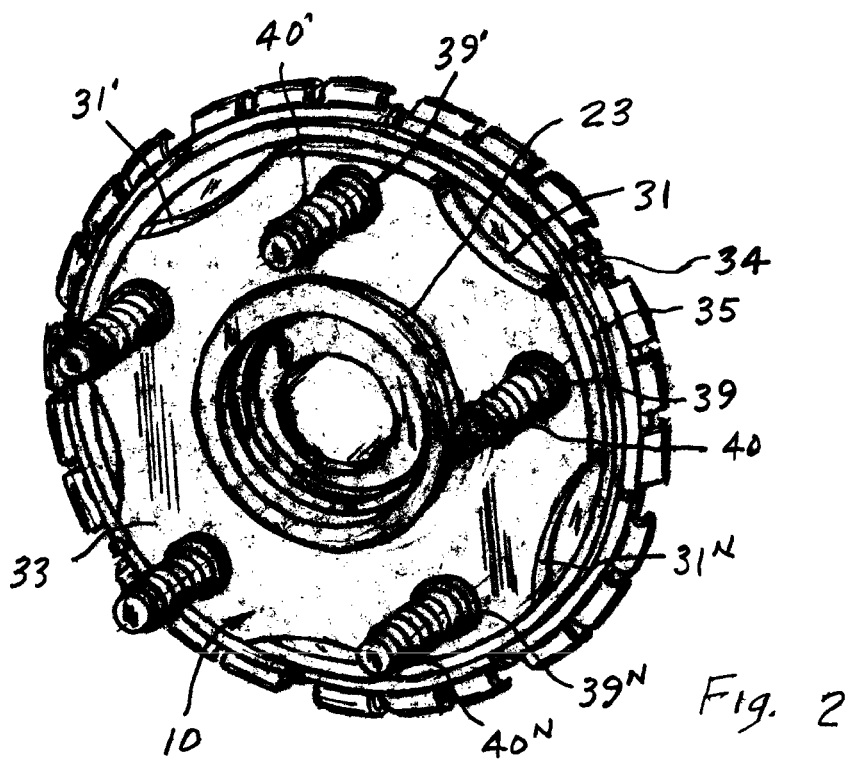
FIG. 2 is an enlarged perspective view of a front side of a wheel hub with the attachment clip of FIG. 1 attached thereto.
Figure 3:
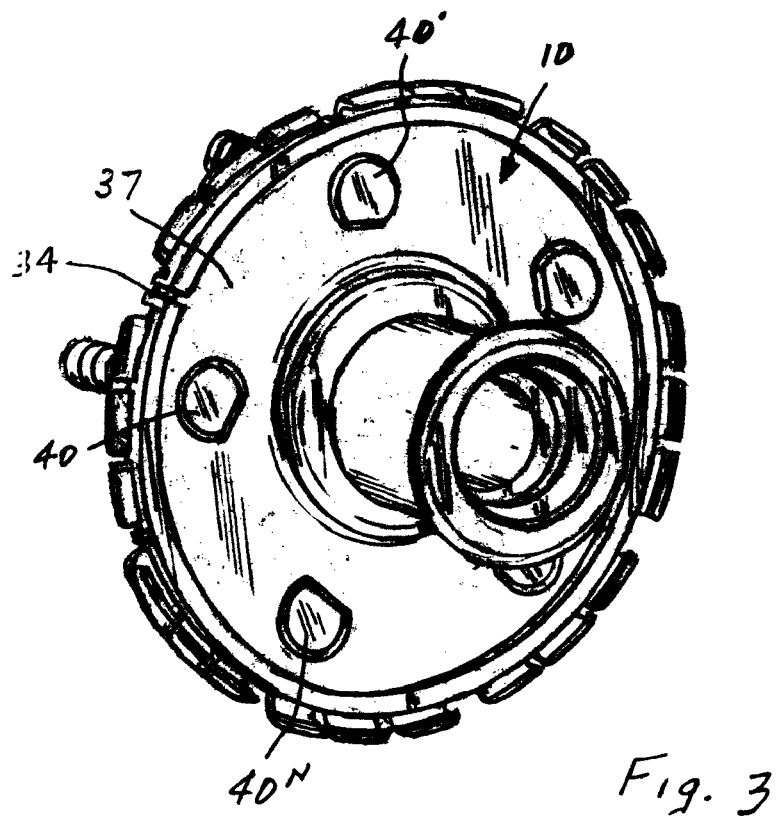
FIG. 3 is an enlarged perspective view of the rear of the wheel hub of FIG. 2.

The attachment clip 100 of the present invention are illustrated in FIG. 1 and shown attached to a wheel hub in FIGS. 2 and 3 and part of a corner module 100 for use in a vehicle in FIG. 4.

The attachment clip 10 is used to attach a rotor 60 to the hub 10 such that engagement surfaces 62a and 62b thereon are aligned between first 40 and second 42 frictions members associated with a caliper 12 that is affixed to a stationary member such as a knuckle on a vehicle. The corner module 100 includes a rim 14 for a wheel is attached to the hub 10 that rotates on bearing member 80 that is attached to the stationary member 16. The rotor 60 rotates with the wheel through the hub 10 and during a revolution of the hub 10 on the bearing member 30 engagement surface 62a and engagement surface 62b pass between the first 40 and second 42 friction members. The bearing member 30 holds the axis X-X of the hub 10 perpendicular to the rotor 60 such that a desired running clearance is maintained between surfaces 62a and 62b and the first 40 and second 42 friction members. When it is desired to effect a brake application, pressurized fluid is supplied to an actuation chamber 11 in caliper 12 that acts on a piston and the caliper to axially move the first 40 and second 42 friction members into corresponding engagement with surfaces 62a and 62b on the rotor. Should the first 40 or second 42 friction members engage a high or low point on an engagement surfaces 62a or 62b of the rotor 60, attachment clip 100 allows the rotor 60 axially translate rather than introduce a reaction force into the system and yet returns the rotor to an initial position perpendicular location to re-establish the desired running clearance on termination of a brake application.

In more particular detail, the hub 10 as shown in FIGS. 2, 3 and 4 has a substantially cylindrical body 18 with a splined axial bore 20 that extends from a first end 22 to a second end 24, a peripheral surface 26 with a flange 28 located adjacent an annular mounting surface 23 on the first end 22 for a rim 14 of a wheel and a bearing surface 25 on the peripheral surface 26 that extends from the second end 24 toward the flange 28.

The flange 28 is located adjacent the annular mounting surface 23 on the first end 22 and includes first radial surface 33 that extends there from to a plurality of scalloped torque receiving surfaces 31,31' . . . 31" and a second radial surface 35 that extends from the torque receiving surfaces 31,31' . . . 31" to an annular peripheral surface 34 defined by a third radial surface 37 that extends from the peripheral surface 26 such that the first radial surface 33, second radial surface 35 and third radial surface 37 are perpendicular to the axis X-X of the splined axial bore 20. The annular peripheral surface 34 has an annular ledge 38 see FIG. 5 that is located thereon adjacent the second radial surface 35. The annular ledger 38 could be expanded into a groove that would be located between the second radial surface 35 and the third radial surface 37 that receive a lip on the attachment clip 100 as hereinafter described.

The flange 28 is further defined by a plurality of axial openings 39, 39' . . . 39" that are located on a fixed radius from the axis X-X of the splined axial bore 20 and are designed to receive a plurality of bolts 40, and 40' . . . 40". The axial openings 39,39' . . . 39" are interspersed between and perpendicular to the scalloped torque receiving surfaces 31,31' . . . 31" such that a rim 14 for the wheel is placed on the first annual surface 23 and retained thereon through the engagement thereof with the first radial surface 33 by torquing nuts 41,41' . . . 41" onto corresponding the bolts 40,40' . . . 40". With the plurality of 40,40' . . . 40" so located the forces created by such torquing does not distort the scalloped torque receiving surface 31,31' . . . 31" on the flange 28 or the second radial surface 35 such that the perpendicular relationship with the axis of the splined axial bore 14 and the flange is retained.

A bearing assembly 80 is of a type having an inner member 82 that is located and retained on bearing surface 25 and an outer member 84 that is connected to fixed member 16 with a plurality of rollers 86 and 88 located there between. The bearing assembly 80 when fixed to the stationary member 16 as illustrated in FIG. 4 aligns a rotor 60 in a perpendicular alignment with the axis of the bearing assembly 80.

Figure 7:
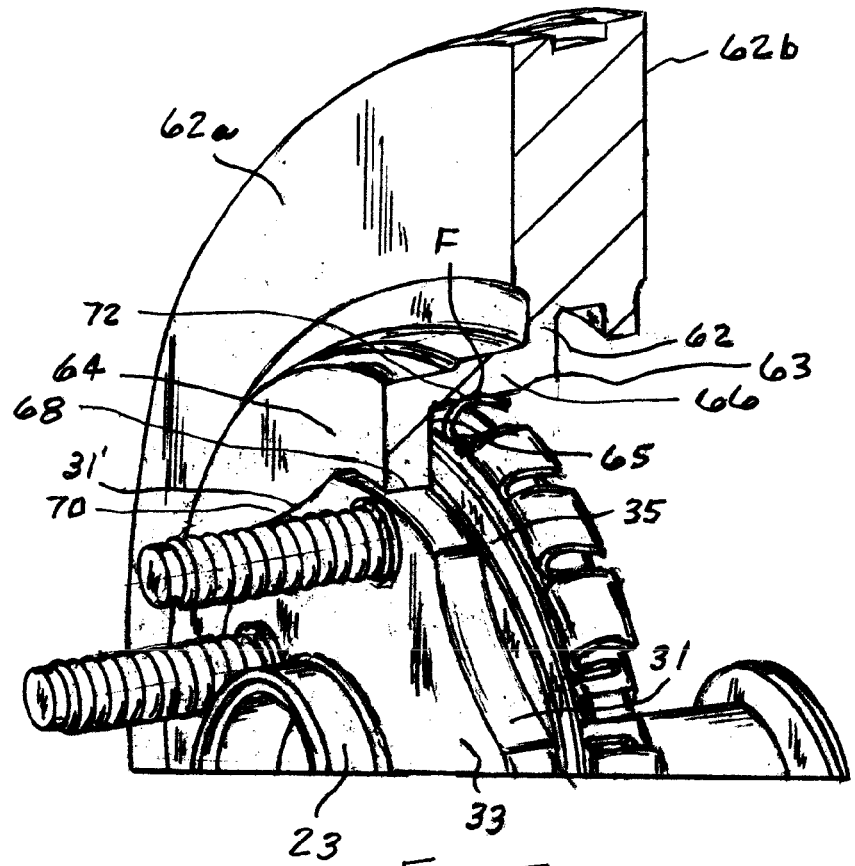
FIG. 7 is an enlarged perspective view of the wheel hub with a sectional view of the rotor and attachment clip to illustrate into engagement of the rotor with the flange.

The rotor 60 as best shown in FIGS. 4 and 7 is defined by a first radial member 64 that is offset from a second radial member 62 on which the first 62a and second 62b engagement faces are located by a cylindrical member 66. The first radial member 64 has an inner peripheral surface 68 on which are located a plurality of arcuate projections 70,70' . . . 70" that have a shape that is complementary to the scalloped torque receiving surfaces 31,31' . . . 31" of the flange 28. The cylindrical member 66 of the rotor 60 has an inner arcuate groove 72 that extends from the first radial member 64 toward the second radial member 62. The exact location, depth and shape of the inner arcuate groove 72 may shift from adjacent face 65 on the first radial member 64 as illustrated in FIG. 5 toward the edge 63 of the second radial member 62 depending on a desired location where a resultant force F is to be applied to attach or join the rotor 60 to flange 28.

The attachment clip 100 through which the rotor 60 is attached to flange 28 is best shown in FIGS. 1, 4, 5 and 7 resiliently urges the rotor 60 toward the second radial surface 35 on flange 28 to establish a perpendicular alignment between engagement faces 62a and 62b on the second radial member 60 and the first 40 and second 42 friction members. The attachment clip 100 is defined by a plurality of fasteners 102,102' . . . 102" each of which has a base 104 with a lip 106 on a first end 108 and an arcuate outward projection 110 that extends from a second end 112 back toward the first end 108. The base 104 of the plurality of fasteners 102,102' . . . 102" are joined together to form a split ring with a corresponding plurality of tabs 114,114' . . . 114" that extend there from wherein with each tab having a lip 116 thereon.

Figure 9:
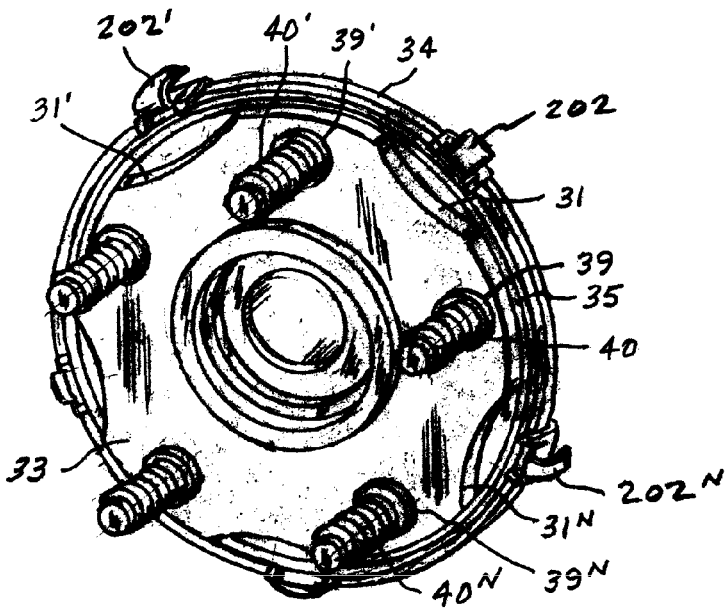
FIG. 9 is a perspective view of wheel hub with the secondary attachment clip of Figure attached to the flange.
Figure 10:
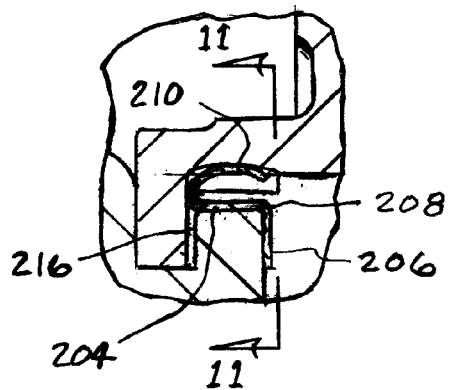
FIG. 10 is a sectional view of a portion of a flange on a wheel hub wherein a rotor is urged into engagement therewith through the secondary clip of FIG. 8.
Figure 8:
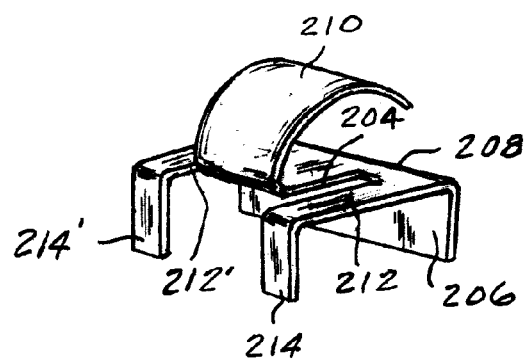
FIG. 8 is a perspective view of a secondary attachment clip.

For some applications, the plurality of fasteners 102, 102' . . . 102" may be not be joined together but defined by single unity 202 as illustrated in FIG. 8 and attached to flange 18 of a wheel hub 10 as illustrated in FIG. 9. Fastener 202 is defined by a base 204 that extend from a lip 206 on a first end 208 to which an arcuate outward projection 210 that extends from a second end 212 back toward the first end 208 with parallel tabs 212 and 212' adjacent to the base 204 that extend from the lip 206 a corresponding second lip 214, 214'. The width of the tabs 212 corresponds to the width of the peripheral surface of 34 on flange 28 as illustrated in FIG. 10.

Figure 12:
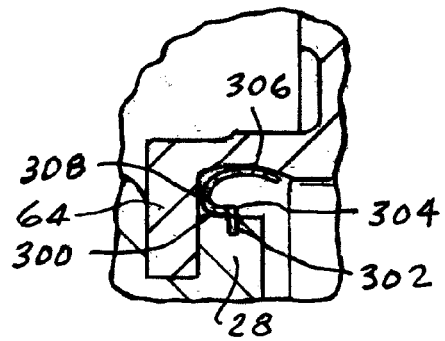
FIG. 12 is a sectional view of a third engagement clip through which a rotor is urged into engagement with a flange on a wheel hub.

A further embodiment 300 of the attachment clip 100 is defined in FIG. 12 and defined by a base 300 with a lip 302 on a first side 304 and an outwardly extending projection 306 on a second side 308 that folds back toward the first side 304 to define a continuous essentially c-shaped arcuate split ring.

A corner module 100 could be manufactured in the following manner.

A hub 10 is obtained from a source and defined by a cylindrical body 18 with a splined axial bore 20 that extends from a first end 22 to a second end 24, a flange 28 that is located on the cylindrical body 18 adjacent the first end 16 wherein the flange 28 has a mounting surface 23 on the first end 22, a first radial surface 33 that extends from the mounting surface 23 to a plurality of scalloped torque receiving surfaces 31,31' . . . 31", a second radial surface 35 that extends from the torque receiving surfaces 31,31' . . . 31" to an annular peripheral surface 34 whose width is defined by a third radial surface 37 that extends from the peripheral surface 26. The width of the annular peripheral surface 34 being reduced by a ledge 38 adjacent the second radial surface 35. The first radial surface 33, second radial surface 35 and third radial surface 37 are perpendicular to the axis X-X of the splined axial bore 20.

Bearing assembly 80 is placed on bearing surface 25 and end 24 rolled to fix the bearing assembly 80 to the wheel hub 10.

An attachment clip 100 as illustrated in FIG. 1 is obtained from a source and defined by a plurality of fasteners 102, 102' . . . 102" each of which has a base 104 with a lip 106 on a first end 108 and an arcuate outward projection 110 that extends from a second end 112 back toward the first end 108 wherein the base 104 of the plurality of fasteners 102, 102' . . . 102" are joined together to form a split ring with a corresponding plurality of tabs 114,114' . . . 114" that extend there from wherein with each tab having a lip 116 thereon.

The attachment clip 100 is placed on the flange 28 as illustrated in FIGS. 2 and 3 such that lip 106 engages the third radial surface 37, see FIG. 6 and the second lip 116 is located on ledge 38 such that base 104 engages the peripheral surface 34 as illustrated in FIG. 5.

A rotor 60 is obtained from a source and defined by a first radial member 64 that is offset from a second radial member 62 by a cylindrical member 66, with the first radial member 64 has an inner peripheral surface 68 with a plurality of arcuate projections 70,70' . . . 70" that have a shape complementary to the scalloped torque receiving surfaces 31,31' . . . 31" of the flange 28, an inner arcuate groove 72 on the cylindrical member 66 of the rotor 60 has that extends from a face 65 the first radial member 64 toward a face 63 on the second radial member 62.

The rotor 60 is aligned with the flange 28 and pushed onto the attachment clip 100 such that the arcuate surface 110 engages the inner surface on the cylindrical member 66 and is compressed as the first radial member 64 is brought toward flange 28 and eventually radial projections 70,70' . . . 70" mated with the scalloped torque receiving surfaces 31,31' . . . 31". The rotor 60 is moved toward flange 28 until face 65 on the first radial member 64 engages radial surface 35 on flange 28. When this engagement occurs, the arcuate surface 110 on the clip arrangement 100 engages groove 72 at a point contact as best shown in FIGS. 5 and 6 to provide a resultant force that has an axial component that axially urges the continued engagement of face 65 with radial surface 35 and a radial component that provides support for the cylindrical member 66. The attachment clip 100 holds the rotor 60 such that the engagement faces 62a and 62b on the second radial member are located in a desired space relationship with friction members 40 and 42 in caliper 12.

With the rotor 60 aligned with the caliper 12 a wheel may now be attached to the hub 10. A rim of the wheel is placed on mounting surface 23 such that bolts 39, 39' . . . 39'" pass through corresponding openings 15,15' . . . 15" in rim 14 and nuts 41, and 41' . . . 41" are attached thereto and a torque of a desired level is applied to bring rim 14 into engagement with the first radial surface 31 on flange 28. The width of the first radial member 64 of the rotor is such that it is less than the width of the scalloped torque receiving surfaces 31,31' . . . 31" and as a result a gap "G" is created between the rim 14 and first radial member 64 so torque applied the nuts 41,41' . . . 41" is not carried into the rotor 60 but the rotor 60 is resiliently retained on the scalloped torque receiving surfaces 31,31' . . . 31" as a function of the resiliency of the arcuate member 110 of the attachment clip 100.

Figure 11:
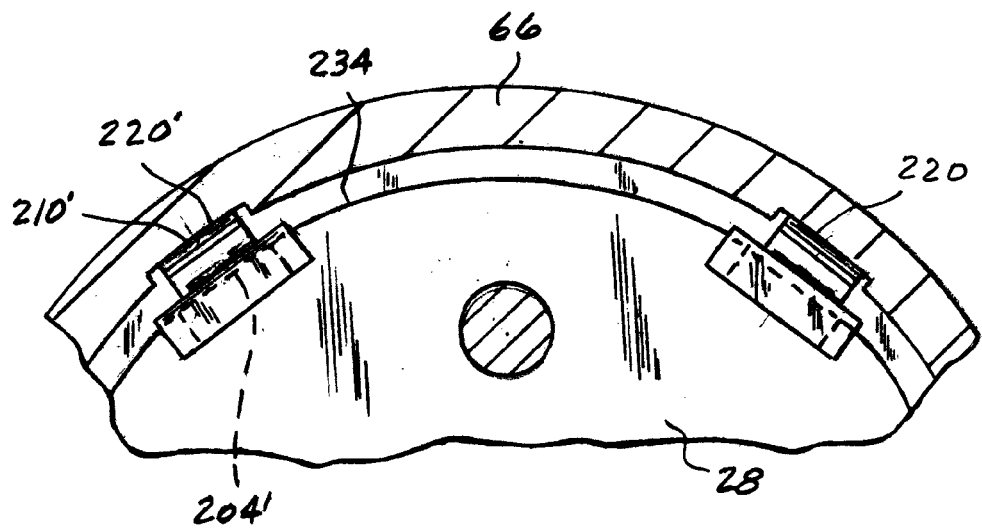
FIG. 11 is a sectional view taken along line 11-11 of FIG. 10 showing the slots in the rotor that receive the resilient arcuate projection on the engagement clip.

The attachment of a rotor 60 to hub 28 through the use of the second attachment clip occurs in a similar manner in the individual units 202 are attached to the flange 28 as illustrated in FIG. 9 and the rotor 60 pushed on to the wheel hub 28 by aligning slots 220 with the arcuate projections 210, illustrated in FIG. 11 to attach the rotor 60 to the hub 28.

The attachment of a rotor 60 to a hub 10 through the use of the third attachment clip occurs in a similarly manner in that lip 302 is located in a groove 38' on the peripheral surface 34' to provide a point contact with an arcuate surface in arcuate groove 72 on the cylindrical member of the rotor 60.

When it is desired to effect a brake application in a vehicle equip with a corner module 100 as illustrated in FIG. 4, pressurized fluid is supplied to chamber 11 that acts on the piston and housing of caliper 12 to correspondingly move friction members 40 and 42 into engagement with engagement faces 62a and 62b on the second radial member of the rotor 60 to retard the rotation of rotor 60 and correspondingly the wheel attached to hub 10. Should the engagement faces 62a or 62b have a high spot when the friction members 40 or 42 engage a high spot the rotor 60 may axially move on the scalloped torque receiving surfaces 31, 31' . . . 31" an amount defined by gap "G" without introducing a stress into system that would effect a perpendicular alignment of the rotor 60 with respect to the bearing assembly 80. Once a brake application is terminated, the axial component of resultant force F returns the rotor 60 to alignment with the flange 28 where the first radial member 64 is tight against the radial surface 35 on the flange 28 and gap G is again present between the rim 14 and first radial member 64.

What is claimed is:

1. A wheel hub of a corner assembly for a vehicle wherein the wheel hub is attached to a stationary member though a bearing, a wheel is attached to the wheel hub, a rotor for a brake system is secured to the wheel hub and a caliper is attached to the stationary member, said wheel hub having a body with an axial bore that extends from a first end to a second end, a peripheral surface with a flange thereon located adjacent said first end with the wheel and the rotor being attached to said flange and a bearing surface that extends from said second end toward said flange with the bearing being located on the bearing surface such that a perpendicular relationship is established between an axis of said bearing and first and second faces on the rotor and as a result during rotation of said wheel hub a desired space relationship is maintained between first and second faces on the rotor and corresponding first and second friction members retained by the caliper, said flange being characterized by being located adjacent a first annular surface on said first end and having a scalloped torque receiving surface adjacent a first radial surface with said torque receiving surface separated from an annular peripheral surface by a second radial surface, and said rotor being characterized by a first radial member that is offset from a second radial member on which the first and second engagement faces are located by a cylindrical member, said first radial member having an inner peripheral surface with a plurality of arcuate projections thereon that are complementary to said scalloped torque receiving surface of said flange, said cylindrical member of the rotor having an inner arcuate groove that extends from said first radial member toward said second radial member, said arcuate projections being mated with said scalloped torque receiving surface such that said first radial member engages said second radial surface to establish said perpendicular relationship between the first and second engagement faces on said second radial member of the rotor; and clip means attached to said annular peripheral surface on said flange and engaging said arcuate groove on said cylindrical member to provide a resultant force that resiliently urges said first radial member toward said second radial surface to sustain said perpendicular relationship.

2. The wheel hub as recited in claim 1 wherein said flange has a plurality of axial openings for receiving a corresponding plurality of bolts though which said wheel is attached to said flange.

3. The wheel hub as recited in claim 2 wherein said plurality of openings are interspersed between and perpendicular to said scalloped torque receiving surface such that the retention of the wheel on said first annual surface and engagement with said first radial surface by said bolts does not effect the mating of said arcuate projections with said scalloped surface.

4. The wheel hub as recited in claim 1 wherein said clip means is defined by a plurality of fasteners that are spaced on said annular peripheral surface to provide said resultant force that acts on said cylindrical member.

5. The wheel hub as recited in claim 4 wherein each of said plurality of fasteners is defined by a base having a lip on a first end and an arcuate outward projection that extends from a second end back toward the first end, said annular peripheral surface on said flange having an annular groove located adjacent said second radial surface for receiving said lip such that said base rests on said annular peripheral surface and said arcuate outward projection engages said annular groove on said cylindrical member.

6. The wheel hub as recited in claim 5 wherein each of said plurality of fasteners has a second lip that extends from said second end, said second lip engaging said a third radial surface of said flange to assist in holding said fastener in a desired location on said flange.

7. The wheel hub as recited in claim 4 wherein said plurality of fasteners are joined together to define a ring.

8. The wheel hub as recited in claim 1 wherein said clip means is defined by a cylindrical member with an axial slot that extends from a first end to a second end, an inward lip on a first end and an annular outward projection that extends from a second end back toward said first end, said annular peripheral surface on said flange having an annular groove located adjacent said second radial surface for receiving said lip such that said cylindrical member rest on said annular peripheral surface and said arcuate outward projection engages said annular groove on said cylindrical member with a point contact to impart said resultant force into said cylindrical member.

9. The wheel hub as recited in claim 1 wherein said resultant force as applied to said cylindrical member creates an axial gap between said first radial member and a wheel that engages said first radial surface such that the rotor may axially move away from said second radial surface as a function of the resultant force.

10. A wheel hub of a corner assembly of a vehicle wherein the wheel hub is attached to a stationary member though a bearing, a wheel is attached to the wheel hub, a rotor for a brake system is secured to the wheel hub and a caliper is attached to the stationary member, said wheel hub having a peripheral surface with a flange for receiving the wheel and the rotor and a bearing surface on which the bearing is located such that a perpendicular space relationship is established between first and second faces on said rotor and second friction members retained by the caliper, said flange being characterized by a scalloped torque receiving surface located adjacent a first radial surface that extends from an annular surface and a second radial surface that extends from the torque receiving surface to an annular peripheral surface; and wherein said rotor is characterized by a first radial member that is offset from a second radial member on which said first and second faces are located by a cylindrical member, said first radial member having an inner peripheral surface with a plurality of arcuate projections thereon that are complementary to said scalloped torque receiving surface on said flange, said cylindrical member having an inner arcuate groove located between said first radial member and said second radial member, said arcuate projections being mated with said scalloped torque receiving surface such that said first radial member engages said second radial surface to establish said perpendicular space relationship; and clip means attached to said annular peripheral surface on said flange and engaging said arcuate groove to provide a resultant force that resiliently urges said first radial member toward said second radial surface to sustain said perpendicular relationship.

11. The wheel hub as recited in claim 10 wherein said clip means includes a plurality of fasteners with each being defined by a base with a lip on a first side and an outwardly extending projection on a second side that folds back toward the first side to define an arcuate shape, said outward extending projection engaging said arcuate groove with a point contact such that the resultant force is reduced into an axial force that urges the first radial member toward said second radial surface and an radial force the dampens any radial movement of said rotor.

12. The wheel hub as recited in claim 11 wherein the base of said plurality of fasteners are connected together to define a split ring.

13. The wheel hub as recited in claim 12 wherein said split ring of said plurality of fasteners further includes a plurality of tabs located in a groove adjacent said second radial surface on said flange to assist in holding said split ring on said annular peripheral surface.

14. The wheel hub as recited in claim 13 wherein said resultant force in urging said first radial member toward the first radial surface creates a gap [between said first radial member and a rim of a wheel that engages said first radial surface such that said rotor may axially translate.

15. A wheel hub of a corner assembly of a vehicle wherein the wheel hub is attached to a stationary member though a bearing, a rim for a wheel is fixed to the wheel hub, a rotor for a brake system is secured to the wheel hub and a caliper is fixed to the stationary member, said wheel hub having a peripheral surface with a flange for receiving the rim for the wheel and the rotor and a bearing surface on which the bearing is located such that a perpendicular space relationship is established between first and second faces on said rotor and first and second friction members retained by the caliper, said flange being characterized by a scalloped torque receiving surface located adjacent a first radial surface that extends from an annular surface and second radial surface that extends from said scalloped torque receiving surface to an annular peripheral surface; and wherein said rotor is characterized by a first radial member that is offset from a second radial member on which said first and second faces are located by a cylindrical member, said first radial member having an inner peripheral surface with a plurality of arcuate projections thereon that are complementary to said scalloped torque receiving surface on said flange, said cylindrical member having a plurality of arcuate slots on an inner surface located between said first radial member and said second radial member, said arcuate projections being mated with said scalloped surface such that said first radial member engages said second radial surface to establish said perpendicular space relationship; and clip means attached to said annular peripheral surface on said flange and engaging said cylindrical member though said plurality of arcuate slots to provide a resultant force that resiliently urges said first radial member toward said second radial surface to sustain said perpendicular relationship.

16. The wheel hub as recited in claim 15 wherein said clip means includes a plurality of fasteners with each being defined by a base with a lip on a first side and an outwardly extending projection on a second side that folds back toward the first side to define an arcuate shape, said outward extending projection engaging said cylindrical member though said arcuate slots with a point contact such that the resultant force is reduced into an axial force that urges the first radial member toward the second radial surface and an radial force the dampens any radial movement of said rotor.

17. The wheel hub as recited in claim 16 wherein the number of said plurality of fasteners is selected to reflect a desired resistance to axial translation of said rotor.

* * * * *